US008420138B2

(12) United States Patent
Knap et al.

(10) Patent No.: US 8,420,138 B2
(45) Date of Patent: Apr. 16, 2013

(54) METHOD TO PRODUCE CHICKENS

(75) Inventors: Inge Knap, Broenshoej (DK); Bente Lund, Frederiksberg (DK); Nelson Carvalho, Sao Paulo (BR); Abilio Alessandri, Sao Paulo (BR)

(73) Assignee: Chr. Hansen A/S, Horsholm (DK)

( * ) Notice: Subject to any disclaimer, the term of this patent is extended or adjusted under 35 U.S.C. 154(b) by 650 days.

(21) Appl. No.: 12/523,039

(22) PCT Filed: Jan. 17, 2008

(86) PCT No.: PCT/EP2008/050480
§ 371 (c)(1),
(2), (4) Date: Nov. 12, 2009

(87) PCT Pub. No.: WO2008/087173
PCT Pub. Date: Jul. 24, 2008

(65) Prior Publication Data
US 2010/0062102 A1    Mar. 11, 2010

(30) Foreign Application Priority Data

Jan. 17, 2007   (DK) ................................ 2007 00070

(51) Int. Cl.
*A23K 1/00* (2006.01)
*A23K 1/18* (2006.01)

(52) U.S. Cl.
USPC .............. 426/53; 426/630; 426/635; 426/805

(58) Field of Classification Search .................... 426/53, 426/635, 630, 805
See application file for complete search history.

(56) References Cited

U.S. PATENT DOCUMENTS

| 4,919,936 A | 4/1990 | Iwanami et al. |
| 2002/0018770 A1 | 2/2002 | Maruta et al. |
| 2003/0099624 A1 | 5/2003 | Porubcan |

FOREIGN PATENT DOCUMENTS

| WO | WO 2004/802200 A1 | 9/2004 |

OTHER PUBLICATIONS

Fritts et al. J. Appl. Poultry Res. vol. 9, pp. 149-155, 2000.*
Hooge et al. J. Appl. Poult. Res. vol. 13, pp. 222-228, 2004.*
Hooge. Feedstuffs, Jan. 2003, vol. 75 (3), pp. 1-5.*
McLean et al. Proc 15th European Symposium on poultry nutrition, Hungary, Sep. 25-29, 2005, pp. 388-390.*
Nutrient Requirements of Poultry, 1994 (National Research Council), Ninth Revised Edition, p. 4, downloaded from http://www.nap.edu/openbook.php?record_id=2114&page=4.*
Lund et al. Proc. 15th Eur. Symp. Poult. Nutr. World's Poultry Science Association, Sep. 2005, pp. 276-278.*
Rostagno et al. "Efficacy of a microbial feed additive—Galliproa—in a corn/soybean meal based broiler diet", downloaded from www.cabi.org/animalscience, 3 pages, Sep. 2005.*
Commercial Poultry Nutrition, $3^{rd}$ Edition, University books, Steven Leeson, John D. Summers, P.O. Box 1326 Guelph, Ontario, Canada N1H6NB.
M. Ignatova et al., "Effect of Adding the Probiotics BIOPRO-I and YEA SACC to Combined Foragers for Broiler Chicken", International Centre of Nauki, Shivotnovbni Nauki Apr.-May 2002.; pp. 89-92.
Nelson Carvalho DVM et al., "Prosepects for Probiotics in Broilers", www.stocarstvo.com. Feed Internationa, vol. 26, No. 10, Nov./Dec. 2005. WATT Publishing Co., USA, www.feedindustrynetwork.com; 5 pgs.
Peter H.A. Sneath, Section 13 Endospore-forming Gram-Positive Rods and Cocci, Bergeys Manual of Systematic Bacteriology, vol. 2, 1986, pp. 1104-1139.
Steven Leeson Ph.D. et al., "Chapter 1 Digestion and Nutrient Availability", Nutrition of the chicken, $4^{th}$ edition, 2001 University books, P.O. Box 1326, Guelg, Ontario, Canada N1H 6N8, pp. 1-2, 5, 529 & 530.
C.H. Williams et al.,"The determination of chromic oxide in faeces samples by atomic absorption spectrophotometry", J. Agric. Sci. (1962), 59, 381-385.
F.W. Hill et al., "Comparison of Metabolizable Energy and Productive Energy Determinations With Growing Chicks", Journal of Nutrition, 64:587-603.

* cited by examiner

*Primary Examiner* — Chhaya Sayala
(74) *Attorney, Agent, or Firm* — Foley & Lardner LLP

(57) ABSTRACT

A method for producing broiler chickens comprising feeding to the chickens a chicken feed comprising from $10^3$ to $10^{11}$ CFU *Bacillus* bacteria per gram feed, characterized by that the chicken feed has a reduced metabolizable feed energy (ME) level of from 85% to 98% ME of the ME in a standard chicken feed (full ~100% ME).

8 Claims, No Drawings

METHOD TO PRODUCE CHICKENS

CROSS-REFERENCE TO RELATED PATENT APPLICATIONS

This application is the U.S. National Phase of PCT/EP2008/050480 filed Jan. 17, 2008, which claims priority to Danish Patent Application No. PA 2007 00070 filed Jan. 17, 2007, which is incorporated herein by reference in it's entirety.

FIELD OF THE INVENTION

The present invention relates to a method for producing broiler chickens comprising feeding chickens with a chicken feed comprising from $10^3$ to $10^{11}$ CFU *Bacillus* bacteria per gram feed, characterized by that the chicken feed has a reduced metabolizable energy (ME) level of from 85% to 98% of the ME in a standard used chicken feed (full ~100% ME).

DESCRIPTION OF THE BACKGROUND

Industrial chicken production is an enormous business reaching a volume of around 6.7 tons in 2007. Optimal feeding of the chickens is an important factor in the process of producing chickens.

The reference book "Commercial Poultry Nutrition" (3rd edition, 2005, ISBN 0-9695600-5-2) is a standard textbook [1] relating to the area of nutritional aspects of chicken production. Below is a summary considered relevant as a background for the present invention.

Diets for chicken are typically referred to as "starter diets" and "grower diets". The major ingredients delivering energy in diets are corn, soybean, soy oil and amino acids. Corn is a major contributor of metabolizable energy. The starch of the endosperm, which is mainly composed of amylopectin, and the germ which is mostly oil constitute the energy value of corn. Typical energy values of corn alone expressed in kcal/kg at 85% dry matter are ranging from 3014 to 3313 (page 12 [1]). Energy levels of starter and grower diets are typically in the range of 3000 to 3100 Kcal/kg. In many countries wheat is also commonly used in poultry diets. Such diets have similar energy levels as mentioned above. As a protein source soybean has become the worldwide standard against which other protein sources are compared. Its amino acid profile is excellent for most types of poultry, and when combined with corn or sorghum, methionine is usually the only factor in inadequate amounts. Additionally, fats and oils provide a concentrated source of energy in the diets and even relatively small changes in levels can have significant effects on diet ME. Finally, the diet is supplemented with synthetic amino acids such as methionine and lysine. Other important sources used are barley, sorghum and other cereals, and byproducts contributing to energy.

With respect to production cost, metabolizable energy (ME) is the most costly nutrient in an ingredient or diet [5]. The determination of metabolizable energy is derived by extrapolation to 100% inclusion from a regression equation relating test diet ME values to proportion of test ingredient in such diets. Feed is assayed for gross energy and nitrogen, and excreta is dried and likewise assayed. All analytical data is usually expressed on a moisture free basis. Reference [5] describes this precisely with examples of such calculations to obtain the final ME value.

The standard recommended metabolizable energy level for chicken feed is well established in the art and chicken producers use such a feed product in order to ensure optimal growth of the chickens. At the filing date of the present application, a chicken producer would generally not use a feed with less than the standard recommended metabolizable energy level as such a feed would result in insufficient growth of the chickens or the chickens would eat far too much feed.

At the filing date of the present application the standard used metabolizable energy level for chicken feed is shown in table 5.12, page 243 of the reference book [1]. The herein most relevant data of this table 5.12 are:

|  | Starter | | | Grower | | |
|---|---|---|---|---|---|---|
|  | Hubbard | Ross | Cobb | Hubbard | Ross | Cobb |
| ME (kcal/kg) | 3000 | 3040 | 3023 | 3080 | 3140 | 3166 |

Hubbard, Ross and Cobb are names of the most commonly used chicken breeds for broiler chicken production.

GalliPro® (Chr. Hansen) is a commercial *Bacillus subtilis* product used in chicken production. This product is a probiotic and as discussed in the reference textbook [1] (page 91-92) such a product is known to be used as a probiotic in chicken production. The reference book [1] describes two major types of probiotic products: viable microbial cultures and microbial fermentation products. Most research has been centered on *Lactobacilli, Bacillus subtilis* and some *Streptococcus* species. It has been suggested that use of probiotics result in a) beneficial change in gut flora with reduction in population of *E. Coli*; b) lactate production with subsequent change in intestinal pH; c) production of bacteriocins substances and d) reduction of toxin release.

Yeast has been used in animal feed and the human food industry for many years. A Bulgarian article [2] mentions the use of *Saccharomyces cerevisiae* and adding of this yeast to diet. Adding BioPro-I (comprising yeast) to the combined forage led to the improvement of forage protein, and adding 0.1% *S. cerevisiae* led to improved utilization of the energy in the forage compared to the group without any probiotic additive. The data in the article [2] shows increasing body weight using standard optimal diets (starter and finisher).

The textbook [1] and this article [2] do not describe using probiotics such as *Bacillus* species to improve utilization of the metabolizable feed energy.

Commercial marketing material information relating to Chr. Hansen's product, GalliPro® can be found in an article by Nelson Carvalho [3] entitled "Prospects for probiotics in broilers" on the Internet.

The Nelson Carvalho article [3] indicates that there may be some improvement of the chicken body weight increase by using GalliPro® in connection with an unspecified chicken feed product. In relation to the chicken feed product the article simply mentions "under commercial-type conditions". The Nelson Carvalho article does not describe anything with respect to a possible GalliPro® related improvement of utilization of the metabolizable feed energy. The article describes the advantages of using probiotics with the purpose of replacing the use of antibiotics, as also described in the textbook [2]. Objectively, the skilled person would understand that the unspecified chicken feed products mentioned in the Nelson Carvalho article [3] would be a feed product with a standard metabolizable energy level as discussed above (i.e. 100% ME)

SUMMARY OF THE INVENTION

The problem to be solved by the present invention may be seen in the provision of a new, cost reducing method for chicken production, which still results in acceptable growth of the chickens.

The solution is based on that the present inventors surprisingly have identified that usage of Bacillus subtilis (GalliPro®) in combination with a chicken feed diet product having less than a standard recommended metabolizable energy level (e.g. 96% ME) one gets a significantly higher, GalliPro® induced, improvement of utilization of the metabolizable feed energy in the feed as compared to use of standard chicken feed diet (e.g. defined as 100% energy).

This identification opens up the possibility of combining e.g. a 96% ME energy level chicken feed product with use of Bacillus subtilis (GalliPro®) in chicken production. The chicken producer would not consider this option as described herein, since he would believe that by using e.g. a 96% ME energy level chicken feed product, he would not get an acceptable growth of the chickens. See working examples for further explanations (experimental data).

Without being limited to theory, there is no reason to believe that the herein described positive effect should only be relevant for Bacillus subtilis. Once identified as for the first time shown herein, the skilled person would expect that it would also work for other Bacillus species such as e.g. Bacillus licheniformis.

It is believed that the combined use of low energy feed and Bacillus would be industrially relevant for feed corresponding to 85% ME as compared to standard energy level defined as 100% ME. Thus, a reduction of "feed EM costs" by 15% can be obtained in the production of chicken using the teaching of the present invention.

Accordingly, a first aspect of the invention relates to a method for producing broiler chickens comprising feeding the chickens with a chicken feed comprising from $10^3$ to $10^{11}$ CFU Bacillus bacteria per gram feed, characterized by that the chicken feed has a reduced metabolizable feed energy (ME) level of from 85% to 98% ME of the ME in a standard used chicken feed (full ~100% ME), where the standard (100%) used chicken feed is having the following ME level:
  i): if chicken is a Hubbard chicken the standard (100%) starter feed ME level is 3000 kcal/kg and the Grower feed ME level is 3080 kcal/kg;
  ii): if chicken is a Ross chicken the standard (100%) starter feed ME level is 3040 kcal/kg and the Grower feed ME level is 3140 kcal/kg;
  iii): if chicken is a Cobb chicken the standard (100%) starter feed ME level is 3023 kcal/kg and the Grower feed ME level is 3166 kcal/kg;
and wherein the metabolizable energy level is determined according to the standard ME assay (with and without the marker $Cr_2O_3$) as described in section "Metabolizable feed energy (ME) level standard assay" herein.

In absolute ME level number, the energy chicken feed reduced from 85% to 98% as used herein have the following absolute ME level:
  i): if chicken is a Hubbard chicken the starter feed metabolizable feed energy level is from 2550 kcal/kg to 2940 kcal/kg and the Grower feed metabolizable feed energy level is from 2618 kcal/kg to 3018 kcal/kg;
  ii): if chicken is a Ross chicken the starter feed metabolizable feed energy level is from 2584 kcal/kg to 2979 kcal/kg and the Grower feed metabolizable feed energy level is from 2669 kcal/kg to 3077 kcal/kg;
  iii): if chicken is a Cobb chicken the starter feed metabolizable feed energy level is from 2570 kcal/kg to 2963 kcal/kg and the Grower feed metabolizable feed energy level is from 2691 kcal/kg to 3103 kcal/kg.

Definitions

Prior to a discussion of the detailed embodiments of the invention a definition of specific terms related to the main aspects of the invention is provided.

The term "Bacillus bacteria" is a well-known and well-defined term for a specific group of bacteria. For further details, please see e.g. the standard reference book Bergey's Manual of Systematic Bacteriology [4]. The Bacillus bacteria may e.g. be in the form of bacterial spores or vegetative bacterial cells.

The term "diet" should be understood according to the art as nutrition needed to produce chickens.

The term "energy" is the general expression used to describe the "gross energy" in a given food or feed product/ingredient. The "metabolizable energy" is the part of the gross energy which can be actually utilized by the animal.

The term "grower feed" used in connection with chicken feed is a standard term known to the skilled person in relation to chicken production. The grower feed is used after the starter feed during the production of chickens. It may e.g. be used after 20 days production. Grower feed may sometimes be termed "Finisher feed". Both terms may be used interchangeably herein.

The term "metabolizable energy" is understood as referred to in reference [5] and is defined as a calculated value where gross energy (kilocalories/gram) and nitrogen (grams/gram) is assayed with and without Chromium as a marker.

The term "probiotic" is a well-defined term in the art and relates to a live microorganism that it confers health benefits to a human or animal when it has been in physical contact (e.g. when eaten, by ingestion) by the human or animal.

The term "starter feed" used in connection with chicken feed is a standard known term for the skilled person in relation to chicken production. The starter feed is used at the start of a chicken production and until it is generally changed to grower feed.

Embodiments of the present invention are described below, by way of examples only.

DETAILED DESCRIPTION OF THE INVENTION

Metabolizable Feed Energy (ME) Level Standard Assay

Herein the ME level of the chicken feed shall be determined according to the well-known standard ME assay as discussed below.

The standard textbook reference [5] describes on page 529-530 the overall standard ME determination method including the relevant ME determination equations shown in table 9.2 and discussed below.

The specific test ingredient ME value is derived by extrapolation to 100% from a regression equation relating test diet and ME values to proportion of test ingredient in such diets. During the bioassay, diets are therefore fed for a 3-4 day acclimatization period, followed by a 2-4 day collection period.

Two assays are used—one where marker $Cr_2O_3$ is added to the feed and one without. The final measured feed ME value is the mean of the two methods used, i.e. with or without $Cr_2O_3$ added to the feed.

Feed is assayed for gross energy and nitrogen, and excreta is dried and likewise assayed. Gross energy is determined by Adiabatic bomb Calorimeter (ASTM Standards 1984. Subscript). Nitrogen is determined by Kjeldahl method (AOAC. 2000, 17.ed. no 984.13, Total nitrogen in Animal feed. Kjeldahl Method). Chromium is determined by atomic absorption spectrophotometer (Avanta sigma-model GBC) using the method described by Williams, C. H., D. J.; ISMAA, O, "The determination of chromic oxide in faeces samples by atomic absorption spectrophotometry" [7].

Both equations (one method not using Chromium and the other using Chromium) can be generalized as follows:

Without the Use of a Marker $Cr_2O_3$

ME of a diet—General equation:
ME of a diet (Total Excreta Collection):

ME kcal/g=Feed intake diet (g)×GE diet (kcal/g)−[Excreta output (g)×GE excreta (kcal/g)]/Feed intake With the Use of a Marker $Cr_2O_3$ In case of marker, there is no need to measure feed intake or excreted output.

ME of a diet (Cr marker):

Indigestibility Factor (IF)=Cr Diet (g/g)/Cr Excreta (g/g)

ME of a diet (Cr marker): GE diet (kcal/g)−[GE excreta (kcal/g)×IF]=ME kcal/g

The precision of the method for calculating ME described above is significantly below 2% and generally around 1%.

Accordingly, the skilled person can by this method clearly and precisely identify whether or not he is using a standard (100%) ME level in the chicken feed or he is using e.g. a reduced 98% level as described herein. Reference [8] describes the above named methodologies and its accuracies. This study especially concluded on the highly precise measurement of metabolized energy by the method described in this patent.

Chicken Feed

Chicken feed diets consist generally of crude proteins, fats, sugars, amino acids, minerals, starch and vitamins. Typical compositions of diets are shown in the table 1 under working examples. There are many ingredients available and chapter 2 in the reference book [1] describes the advantages and disadvantages of the common ingredients in such diets in detail.

The major ingredients delivering energy in diets are corn, wheat, soybean, soy oil and amino acids. Corn can be a major contributor of metabolizable energy.

In a preferred embodiment the chicken feed has a reduced metabolizable feed energy (ME) level of from 88% to 97% ME of the ME in the standard used chicken feed (full~100% ME) as defined above in the first aspect of the invention, more preferably the chicken feed has a reduced metabolizable feed energy (ME) level of from 90% to 96% ME of the ME in the standard used chicken feed (full ~100% ME) and most preferably the chicken feed has a reduced metabolizable feed energy (ME) level of from 92% to 96% ME of the ME in the standard used chicken feed (full ~100% ME) as defined above in the first aspect of the invention.

As described above, an advantage of the present invention is that the chicken producer can use a reduced energy feed and yet obtain good growth of the chickens.

Accordingly, the preferred embodiment is a method as described herein, wherein a chicken producer uses a standard chicken feed (100% ME) and then actively changes the chicken feed to a reduced energy level chicken feed as defined in the first aspect, and then uses this reduced energy level chicken feed together with *Bacillus* bacteria.

Chickens

As mentioned above, Hubbard, Ross and Cobb are types of the most commonly used chicken breeds for broiler chicken production. The skilled person can routine identify whether or not a chicken is a Hubbard, Ross and/or Cobb chicken.

In working examples herein positive effects have been demonstrated on Ross type chickens. A Ross chicken is a preferred embodiment in the present context.

Probiotic *Bacillus* bacteria

Preferably, the probiotic *Bacillus* bacteria is a bacteria selected from at least one bacteria of the group consisting of *B. subtilis, B. licheniformis, B. coagulans* and *B. cereus*. Combinations of different *Bacillus* species may also be used.

Most preferably the *Bacillus* bacteria is a *B. subtilis*.

The product GalliPro® (Chr. Hansen) comprises the *B. subtilis* DSM17299. This *B. subtilis* strain is a preferred embodiment herein.

The chicken feed product may also comprise other non-*Bacillus* microorganisms.

GalliPro® is normally included in chicken feed in an amount of around $3.2 \times 10^6$ CFU *Bacillus* probiotic bacteria per gram feed. (CFU/g feed).

Accordingly, in the present context the chicken feed preferably comprises from $10^4$ to $10^{10}$ CFU *Bacillus* probiotic bacteria per gram feed, more preferably from $10^5$ to $10^8$ CFU *Bacillus* probiotic bacteria per gram feed and most preferably from $10^5$ to $10^7$ CFU *Bacillus* probiotic bacteria per gram feed, even more and most preferred to $10^6$ to $10^7$.

As mentioned above, the probiotic *Bacillus* bacteria may e.g. be in the form of bacterial spores or vegetative bacterial cells. Preferably probiotic *Bacillus* bacteria are in the form of bacterial spores.

EXAMPLES

Example 1

Performance Trial with Broiler Chickens

Material and Methods

A total of 800 one day-old male broiler chickens of a commercial strain (Ross 308) were used in floor pens of 1.0 m×1.5 m in size, resulting in a density from day 20 to day 41 of 13.3 bird/$m^2$ and approximately 33.3 kg/$m^2$ at day 41 (2.5 kg/bird). The experimental period lasted for 41 days, consisting of the starter phase, from day 1 to day 20, and the grower phase, from day 20 to day 41.

The birds were randomly distributed in a factorial design 2×2 (diet×probiotic) with 4 treatments, 8 replicates and 25 birds per experimental unit (pen) in the starter phase and 20 birds in the grower/finisher phase. The experimental treatments were: the addition of a probiotic (GalliPro at an inclusion rate of 500 g/ton) to 100% ME diets (C), starter and grower—and another with a 4% reduction of the energy nutritional level (NC). Similar diets without the addition of GalliPro were included as control treatments. All experimental diets including vitamin and mineral premixes did not contain any growth promoting substance or enzymes.

Experimental Treatments—Starter and Grower Diets:

| Treatment | Adequate Diets = ME100 | Treatment | Diets reduced by 4% in ME |
|---|---|---|---|
| 1 | Control (C) | 3 | Control (NC) |
| 2 | C + GalliPro | 4 | NC + GalliPro |

The diets in treatment 1 and 2 were formulated to contain corn, and soybean meal with adequate nutrient levels, following the recommendations of the Brazilian Tables [6]. The diets of treatments 3 and 4 were calculated with a 4% reduction in metabolizable energy only. The basal diets were analyzed for dry matter, energy, protein and amino acids.

Table 1 below shows the composition of a typical example of a full 100% ME diet with named ingredients as known in the art, and a reduced feed diet analyzed to be a 96% ME diet.

TABLE 1

Composition of the Basal Experimental Diets

|  | Starter 01 to 20 days of age | | Grower/Finisher 20 to 41 days of age | |
| --- | --- | --- | --- | --- |
|  | Treat 1 (100%) | Treat 3 (96%) | Treat 1 (100%) | Treat 3 (96%) |
| Corn | 55.174 | 58.008 | 60.556 | 63.533 |
| Soybean Meal | 37.320 | 36.808 | 31.499 | 30.961 |
| Soybean Oil | 3.435 | 1.109 | 4.231 | 1.788 |
| Dicalcium Phosphate | 1.852 | 1.845 | 1.615 | 1.607 |
| Limestone | 0.907 | 0.912 | 0.832 | 0.838 |
| Salt | 0.502 | 0.501 | 0.465 | 0.464 |
| DL-Methionine | 0.239 | 0.235 | 0.210 | 0.206 |
| L-lysine | 0.130 | 0.140 | 0.152 | 0.162 |
| L-Threonine | 0.026 | 0.027 | 0.025 | 0.026 |
| Vitamin Premix[1] | 0.100 | 0.100 | 0.100 | 0.100 |
| Mineral Premix[2] | 0.050 | 0.050 | 0.050 | 0.050 |
| Choline Cloride | 0.100 | 0.100 | 0.100 | 0.100 |
| Anticoc. (Salinomycin 12%) | 0.055 | 0.055 | 0.055 | 0.055 |
| Antioxidant (BHT) | 0.010 | 0.010 | 0.010 | 0.010 |
| Starch[3] | 0.100 | 0.100 | 0.100 | 0.100 |
| Total | 100.000 | 100.000 | 100.000 | 100.000 |
| Metab. Energy kcal/kg | 3030 | 2910 | 3150 | 3024 |
| Crude Protein, % | 21.74 | 21.75 | 19.55 | 19.56 |
| Calcium, % | 0.908 | 0.908 | 0.809 | 0.809 |
| Phosphorus Avail, % | 0.454 | 0.454 | 0.404 | 0.404 |
| Arginine dig., % | 1.393 | 1.387 | 1.226 | 1.220 |
| Glycine + Serine total, % | 1.975 | 1.975 | 1.769 | 1.768 |
| Isoleucine dig., % | 0.860 | 0.858 | 0.763 | 0.760 |
| Lysine dig., % | 1.170 | 1.170 | 1.050 | 1.050 |
| Met. + Cist. Dig., % | 0.831 | 0.831 | 0.756 | 0.756 |
| Methionine dig., % | 0.539 | 0.537 | 0.486 | 0.484 |
| Threonine dig., % | 0.761 | 0.761 | 0.683 | 0.683 |
| Tryptophan dig., % | 0.242 | 0.241 | 0.213 | 0.212 |
| Valine dig., % | 0.914 | 0.914 | 0.820 | 0.820 |

[1]Mineral Premix - Amount per kg of diet: Mn, 65 mg; Fe, 50.0 mg; Zn, 60.0 mg; Cu, 10.0 mg; I, 0.8 mg; Se, 0.3 mg.
[2]Vitamin Premix - Amount per kg of diet: Vitamin A, 10.000 UI; Vitamin D3, 2.000 UI; Vitamin E, 35 UI; Vitamin K3, 1.7 mg; Vitamin B1, 1.5 mg; Vitamin B6, 2.4 mg; Vitamin B12, 12 mcg; Pantothenic Ac., 12.0 mg; Biotin, 0.07 mg; Folic Ac., 0.7 g; Nicotinic Ac., 35 g.
[3]GalliPro ® replaced the same amount of Starch in the experimental diets ME values (kcal/kg) were calculated values assayed by the two methods (with or without Chromium oxide) as described above. Coefficient of variation was estimated to 1.69%.

Birds and feed were weighed, on a pen basis, at 20 and 41 days of age to determine performance (weight gain, feed intake and feed conversion (i.e. the ratio between feed consumed and weight gained), mortality, losses and production index (Daily Weight Gain, kg)×(100−Mortality)/(Feed Conversion)×10.

Feed and water were provided ad libitum throughout the trial.

Experimental Results—Starter Phase.

The performance parameters of the birds in the period of day 1 to day 20 are shown in the tables 2 and 3.

TABLE 2

Feed Intake and Body Weight (g/bird) of Broilers from 1 to 20 days of age

|  | Feed Intake | | Body Weight | |
| --- | --- | --- | --- | --- |
| Treatments | ME 100 | ME 96 | ME 100 | ME 96 |
| Control | 1022.3 | 1039.1 | 765.3 | 734.7 |
| C + GalliPro | 1004.9 | 1039.3 | 765.8 | 753.2 |
| Difference | −17.4 | +0.2 | +0.5 | +18.5 |
| Relative % | −1.7% | 0% | 0% | +2.5% |

Use of GalliPro® in a corn/soy diet did not improve body weight in the period from day 1 to day 20, but did reduce the feed intake. Use of GalliPro® in a metabolized energy reduced diet improved the body weight of the birds by 2.5%.

TABLE 3

Weight Gain (g/bird) and Feed Conversion (g/g) of Broilers from 1 day to 20 days of age

|  | Weight Gain | | Feed Conversion | |
| --- | --- | --- | --- | --- |
| Treatments | ME 100 | ME 96 | ME 100 | ME 96 |
| Control | 723.1 | 692.5 | 1.414 | 1.503 |
| C + GalliPro ® | 723.5 | 710.9 | 1.380 | 1.451 |
| Difference | +0.4 | 18.4 | 0.034 | 0.052 |
| Relative % | 0% | 2.7% | −2.4% | −3.5% |

Use of GalliPro® in a corn/soy adequate nutrient broiler diet improved the feed conversion by 2.4%. GalliPro® in a metabolizable energy reduced diet (ME96) improved the feed conversion even further as the table 3 shows by 3.5%.

Experimental Results—Starter and Grower Phase.

The performance parameters of the birds in the period from day 1 to day 41 are shown in the tables 4 to 6.

TABLE 4

Feed Intake and Body Weight (g/bird) of Broilers from 1 to 41 days of age.

| Treatments | Feed Intake | | Body Weight | |
|---|---|---|---|---|
| | ME 100 | ME 96 | ME 100 | ME 96 |
| Control | 4552.7 | 4626.5 | 2658.6 | 2614.2 |
| C + GalliPro | 4505.2 | 4627.8 | 2682.7 | 2660.6 |
| Difference | −47.5 | +1.3 | +24.1 | +46.4 |
| Relative % | −1% | 0% | +0.9% | +1.8% |

Use of GalliPro® in a corn/soy adequate nutrient broiler diet improved body weight in the period from day 1 to day 41 by 0.9%. Use of GalliPro in a metabolized energy reduced diet improved the body weight of the birds further by 1.8%.

TABLE 5

Weight Gain (g/bird) and Feed Conversion (g/g) and Feed Conversion (g/g) of Broilers from 1 to 41 days of age.

| Treatments | Weight Gain (g./bird) | | Feed Conversion | |
|---|---|---|---|---|
| | ME 100 | ME 96 | ME 100 | ME 96 |
| Control | 2616.4 | 2572.0 | 1.740 | 1.800 |
| C + GalliPro ® | 2640.5 | 2618.4 | 1.707 | 1.768 |
| Difference | 24.1 | 46.4 | −0.03 | −0.03 |
| Relative % | 0.9% | 1.8% | −1.9% | −1.8% |

TABLE 6

Productive Efficiency Index (PEI) of Broilers from 1 to 41 days of age.

| Treatments | PEI | |
|---|---|---|
| | ME 100 | ME 96 |
| Control | 339.2 | 331.0 |
| C + GalliPro ® | 337.7 | 336.4 |
| Difference | −1.5 | +5.4 |
| Relative % | −0.4% | +1.6% |

Use of GalliPro® in a metabolized energy reduced diet improved the Productive Efficiency Index (PEI) of Broilers from 1 to 41 days of age by 1.6% where the effect of GalliPro® in a corn/soy adequate nutrient broiler diet influence the PEI with −0.4% compared to the control diet without GalliPro®.

Example 2

Metabolizable Energy

A total of 128 male broiler chicks (26 days old) of a commercial strain (Ross 308) were transferred to metabolic cages. The experimental period lasted from day 26 to day 37. The birds were fed experimental starter diets (treatments 1 to 4) from 1 to 20 days of age and grower diets from 20 to 37 days of age (see table 7).

The birds were randomly distributed in a factorial design 2×2 (diet×probiotic) with 4 treatments, 8 replicates and 4 birds per experimental unit (cage). The experimental treatments were: The addition of a probiotic (GalliPro®) to two grower diets (one nutritionally adequate and one with a 4% reduction of the energy levels).

The diets in treatment 1 and 2 were formulated to contain corn and soybean meal with adequate nutrient levels, following the recommendations of the Brazilian Tables [6]. Diets of treatment 3 and 4 were formulated with a 4% reduction in metabolizable energy.

Chromic oxide ($Cr_2O_3$) was added to the experimental diets at the level of 0.50%, as an indigestible marker. Feed and water were provided ad libitum throughout the trial.

The experimental treatments:

| Treatment | Adequate Diets | Treatment | Diets reduced by 4% in ME |
|---|---|---|---|
| 1 | Control (C) | 3 | Control (NC) |
| 2 | C + GalliPro ® | 4 | NC + GalliPro ® |

The phase from day 26 to day 31 (5 days) was considered as an adaptation to the diets and cages. Then from day 31 to day 36 (5 days), feed consumption and total excreta production per pen were measured to determine the metabolizable energy values (Apparent ME and Apparent Nitrogen Corrected ME) of the experimental grower diets.

TABLE 7

Composition of the Basal Experimental Diets

| | Starter 1 to 20 days of age | | Grower/Finisher 20 to 41 days of age | |
|---|---|---|---|---|
| | Treat 1 (100%) | Treat 3 (96%) | Treat 1 (100%) | Treat 3 (96%) |
| Corn | 55.174 | 58.008 | 60.556 | 63.533 |
| Soybean Meal | 37.320 | 36.808 | 31.499 | 30.961 |
| Soybean Oil | 3.435 | 1.109 | 4.231 | 1.788 |
| Dicalcium Phosphate | 1.852 | 1.845 | 1.615 | 1.607 |
| Limestone | 0.907 | 0.912 | 0.832 | 0.838 |
| Salt | 0.502 | 0.501 | 0.465 | 0.464 |
| DL-Methionine | 0.239 | 0.235 | 0.210 | 0.206 |
| L-lysine | 0.130 | 0.140 | 0.152 | 0.162 |
| L-Threonine | 0.026 | 0.027 | 0.025 | 0.026 |
| Vitamin Premix[1] | 0.100 | 0.100 | 0.100 | 0.100 |
| Mineral Premix[2] | 0.050 | 0.050 | 0.050 | 0.050 |
| Choline Cloride | 0.100 | 0.100 | 0.100 | 0.100 |
| Anticoc. (Salinomycin 12%) | 0.055 | 0.055 | 0.055 | 0.055 |

TABLE 7-continued

Composition of the Basal Experimental Diets

|  | Starter 1 to 20 days of age | | Grower/Finisher 20 to 41 days of age | |
|---|---|---|---|---|
|  | Treat 1 (100%) | Treat 3 (96%) | Treat 1 (100%) | Treat 3 (96%) |
| Antioxidant (BHT) | 0.010 | 0.010 | 0.010 | 0.010 |
| Starch[3] | 0.100 | 0.100 | 0.100 | 0.100 |
| Total | 100.000 | 100.000 | 100.000 | 100.000 |
| Metab. Energy kcal/kg | 3030 | 2910 | 3150 | 3024 |
| Crude Protein, % | 21.74 | 21.75 | 19.55 | 19.56 |
| Calcium, % | 0.908 | 0.908 | 0.809 | 0.809 |
| Phosphorus Avail, % | 0.454 | 0.454 | 0.404 | 0.404 |
| Arginine dig., % | 1.393 | 1.387 | 1.226 | 1.220 |
| Glycine + Serine total, % | 1.975 | 1.975 | 1.769 | 1.768 |
| Isoleucine dig., % | 0.860 | 0.858 | 0.763 | 0.760 |
| Lysine dig., % | 1.170 | 1.170 | 1.050 | 1.050 |
| Met. + Cist. Dig., % | 0.831 | 0.831 | 0.756 | 0.756 |
| Methionine dig., % | 0.539 | 0.537 | 0.486 | 0.484 |
| Threonine dig., % | 0.761 | 0.761 | 0.683 | 0.683 |
| Tryptophan dig., % | 0.242 | 0.241 | 0.213 | 0.212 |
| Valine dig., % | 0.914 | 0.914 | 0.820 | 0.820 |

[1]Mineral Premix - Amount per kg of diet: Mn, 65 mg; Fe, 50.0 mg; Zn, 60.0 mg; Cu, 10.0 mg; I, 0.8 mg; Se, 0.3 mg.
[2]Vitamin Premix - Amount per kg of diet: Vitamin A, 10,000 UI; Vitamin D3, 2,000 UI; Vitamin E, 35 UI; Vitamin K3, 1.7 mg; Vitamin B1, 1.5 mg; Vitamin B6, 2.4 mg; Vitamin B12, 12 mcg; Pantothenic Ac., 12.0 mg; Biotin, 0.07 mg; Folic Ac., 0.7 g; Nicotinic Ac., 35 g.
[3]GalliPro ® replaced the same amount of Starch in the experimental diets.

ME values (kcal/kg) were calculated values assayed by the two methods (with or without Chromium oxide) as described above. Coefficient of variation was estimated at 1.69%.

Experimental Results

The Apparent Metabolizable Energy and the Apparent Nitrogen corrected Metabolizable Energy values of the diets determined with 31 to 36 days of age broilers are shown in Table 8.

TABLE 8

Metabolizable Energy (ME) Values (kcal/kg Dry Matter) of the Grower Diets Determined with Broiler Chickens.

|  | ME | | ME N Corrected | |
|---|---|---|---|---|
| Treatments | ME 100 | ME 96 | ME 100 | ME 96 |
| Control | 3582 | 3444 | 3430 | 3291 |
| C + GalliPro ® | 3651 | 3555 | 3502 | 3408 |
| Difference | +69 | +111 | +72 | +117 |
| Relative % | 1.9% | 3.2% | 2.0% | 3.6% |

Use of GalliPro® in a corn/soy adequate nutrient broiler diet improves the metabolizable energy (N corrected) of the diet by 1.9%. The use of GalliPro® in a metabolizable energy reduced diet increases the metabolized energy (N corrected) even further obtaining improvements of 3.6%.

REFERENCES

1. Commercial Poultry nutrition, 3rd Edition, University books, Steven Leeson, John D. Summers, P.O. Box 1326 Guelph, Ontario, Canada N1H 6N8.
2. M. Ignatova, H. Stanchev, International centre of Nauki, Shivotnovbni Nauki 4-5/2002.; pages 89-92.
3. Prospects for antibiotics in broilers, www.stocarstvo.com, Nelson Carvalho, DVM, Steffen Hansen, MCS. Feed international, vol. 26, #10, November/December 2005. Watt publishing Co.; USA www.feedindustrynetwork.com
4. Bergey's Manual of Systematic Bacteriology Volume 2; 1986 page nos. 1104-1139
5. Nutrition of the chicken, 4th edition, 2001 by Steven Leeson and John D. Summers, University books P.O. box 1326, Guelg, Ontario, Canada N1H 6N8.
6. Rostagno, H., L. Albino, J. Donzele, P. Gomes, R. Oliveira, D. Lopes, A. Ferreira & S. Barreto (2005) "Brazilian tables for poultry and swine. Composition of feedstuffs and nutritional requirements". 2nd edition, Univ. Federal de Viøosa, Viøosa MG, Brazil, 181 p.
7. The determination of chromic oxide in faeces samples by atomic absorption spectrophotometry. J. Agri. Sci., vol 59, page 381-385, 1962.
8. Comparison of metabolizable energy and productive energy determinations with growing chicks. F. W. Hill and D. L Andersen. Hill and Anderson (1958). Comparison of metabolisable energy and productive energy determination with growing chicks. Journal of nutrition, 64: 587-603.

The invention claimed is:

1. A method for producing broiler chickens comprising feeding to the chickens a chicken feed comprising from $10^3$ to $10^{11}$ CFU *Bacillus* bacteria per gram feed, wherein the chicken feed has a reduced metabolizable feed energy (ME) level of from 85% to 98% of the in a standard used chicken feed, wherein the standard used feed is 100% ME and has the following ME level:
   i) for a Hubbard chicken the standard feed ME level in a starter diet is 3000 kcal/kg and the standard feed ME level in a grower diet is 3080 kcal/kg;
   ii) for a Ross chicken the standard feed ME level in the starter diet is 3040 kcal/kg and the standard feed ME level in the grower diet is 3140 kcal/kg; and
   iii) for a Cobb chicken the standard feed ME level in the starter diet is 3023 kcal/kg and the standard feed ME level in the grower diet is 3166 kcal/kg,
and wherein the metabolizable energy level is determined according to a standard ME assay with and without the marker $Cr_2O_3$.

2. The method of claim 1, wherein the chicken feed is a chicken feed that comprises at least one ingredient selected from the group consisting of corn, wheat, soybean, and soy oil.

3. The method of claim 1, wherein the chicken feed has a reduced ME level of from 92% to 96% M of the in the standard chicken feed where the standard used chicken feed has the following ME level:
   i): for a Hubbard chicken the standard feed ME level in the starter diet is 3000 kcal/kg and the standard feed ME level in the grower diet is 3080 kcal/kg;
   ii): for a Ross chicken the standard feed ME level in the starter diet is 3040 kcal/kg and the standard feed ME level in the grower diet is 3140 kcal/kg;
   iii): for a Cobb chicken the standard feed ME level in the starter diet is 3023 kcal/kg and the standard feed ME level in the grower diet is 3166 kcal/kg;
and wherein the metabolizable energy level is determined according to a standard ME assay with and without the marker $Cr_2O_3$.

4. The method of claim 1, wherein the *Bacillus* bacteria is a *B. subtilis*.

5. The method of claim 4, wherein the *B. subtilis* is the *B. subtilis* DSM17299.

6. The method of claim 1, wherein the chicken feed comprises from $10^5$ to $10^7$ CFU *Bacillus* bacteria per gram feed.

7. The method of claim 2, wherein the chicken feed has a reduced ME level of from 92% to 96% of the ME in the standard chicken feed where the standard used chicken feed has the following ME level:
   i): for a Hubbard chicken the standard feed ME level in the starter diet is 3000 kcal/kg and the standard feed ME level in the grower diet is 3080 kcal/kg;
   ii): for a Ross chicken the standard feed ME level in the starter diet is 3040 kcal/kg and the standard feed ME level in the grower diet is 3140 kcal/kg;
   iii): for a Cobb chicken the standard feed ME level in the starter diet is 3023 kcal/kg and the standard feed ME level in the grower diet is 3166 kcal/kg;
and wherein the metabolizable energy level is determined according to a standard ME assay with and without the marker $Cr_2O_3$.

8. A method for producing broiler chickens, comprising feeding to the chickens a standard first chicken feed, wherein the standard first chicken feed has 100% metabolizable feed energy (ME), and then actively changing the chicken feed to a second chicken feed comprising from $10^3$ to $10^{11}$ CFU *Bacillus* bacteria per gram feed, wherein the second chicken feed has a reduced energy level chicken feed of from 85% to 98% of the ME in the standard chicken feed where the standard used chicken feed has the following ME level:
   i): for a Hubbard chicken the standard feed ME level in the starter diet is 3000 kcal/kg and the standard feed ME level in the grower diet is 3080 kcal/kg;
   ii): for a Ross chicken the standard feed ME level in the starter diet is 3040 kcal/kg and the standard feed ME level in the grower diet is 3140 kcal/kg;
   iii): for a Cobb chicken the standard feed ME level in the starter diet is 3023 kcal/kg and the standard feed ME level in the grower diet is 3166 kcal/kg;
and wherein the metabolizable energy level is determined according to a standard ME assay with and without the marker $Cr_2O_3$.

* * * * *